United States Patent
Ohara et al.

(10) Patent No.: US 6,194,092 B1
(45) Date of Patent: Feb. 27, 2001

(54) FUEL CELL APPARATUS

(75) Inventors: Hideo Ohara, Kadoma; Makoto Uchida, Hirakata; Yasushi Sugawara, Neyagawa, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/187,221

(22) Filed: Nov. 6, 1998

(30) Foreign Application Priority Data

Nov. 7, 1997 (JP) ..................................... 9-305458

(51) Int. Cl.⁷ ............................ H01M 8/04; H01M 16/00
(52) U.S. Cl. .................................... 429/9; 429/22; 429/26
(58) Field of Search .................... 429/9, 22, 26, 429/34

(56) References Cited

U.S. PATENT DOCUMENTS

| | | | |
|---|---|---|---|
| 3,331,704 | * 7/1967 | Vickers et al. | 429/22 |
| 3,473,963 | * 10/1969 | Sanderson | 429/26 X |
| 5,023,150 | * 6/1991 | Takabayashi | 429/22 |
| 5,200,278 | 4/1993 | Watkins et al. | 429/24 |
| 5,314,762 | 5/1994 | Hamada et al. | 429/37 |
| 5,334,463 | * 8/1994 | Tajima et al. | 429/9 |
| 5,407,756 | * 4/1995 | Sprouse | 429/26 X |
| 5,932,365 | * 8/1999 | Lin et al. | 429/34 X |

FOREIGN PATENT DOCUMENTS

| | | |
|---|---|---|
| 2028978 | 5/1992 | (CA). |
| 0817298 | 1/1997 | (EP). |
| 0788172 | 8/1997 | (EP). |
| 54-22537 | 2/1979 | (JP). |
| 2260371 | 10/1990 | (JP). |
| 4-308662 | 10/1992 | (JP). |
| 0660894 | 3/1994 | (JP). |
| 97-27637 | 7/1997 | (WO). |

OTHER PUBLICATIONS

European Search Report dated Mar. 17, 1999.
Patent Abstracts of Japan, vol. 97, No. 5, May 30, 1997, JP 09–022719A (Sanyo Electric Co Ltd), Jan. 21, 1997.
Patent Abstracts of Japan, vol. 97, No. 4, Apr. 30, 1997, JP 08–321317A (Sanyo Electric Co Ltd.), Dec. 3, 1996.
Patent Abstracts of Japan, vol. 97, No. 7, Jul. 31, 1997, JP 09–073912A (Sanyo Electric Co Ltd), Mar. 18, 1997.
Voss, et al., "Portable Fuel Cell Power Generator," Journal of Power Sources, vol. 65, No. 1, Mar. 1997, pp. 155–158, XP004059644.
Frysinger, "The Economical Fuel Cell," I.E.E.E. Spectrum, vol. 6, No. 3, Mar. 1969, pp. 83–90, XP002090617.

* cited by examiner

Primary Examiner—Stephen Kalafut
(74) Attorney, Agent, or Firm—Stevens, Davis, Miller & Mosher, L.L.P.

(57) ABSTRACT

A fuel cell apparatus of a compact size uses a hydrogen storage alloy, in which heat can be efficiently transmitted from fuel cell bodies to the hydrogen storage alloy. The fuel cell apparatus includes a plurality of fuel cell bodies, a hydrogen storage tank, a hydrogen supply device for supplying hydrogen to the fuel cell bodies from the hydrogen storage tank, an air feed device for supplying the air, supplying oxygen, a secondary battery, and a casing receiving the above components therein which casing has air intake ports and an air discharge port for the air feed device, and is formed as to enable the hydrogen storage tank to be introduced into and removed from the casing. The hydrogen storage tank is disposed on that side surface of each of at least one pair of fuel cell bodies, facing away from a cathode thereof, through a heat transmission device. With this construction, the energy of heat, generated by the fuel cell bodies, is efficiently transmitted to the hydrogen storage tank, and the stable supply of the hydrogen can be achieved, and the whole of the power system can be formed into a compact design.

3 Claims, 4 Drawing Sheets

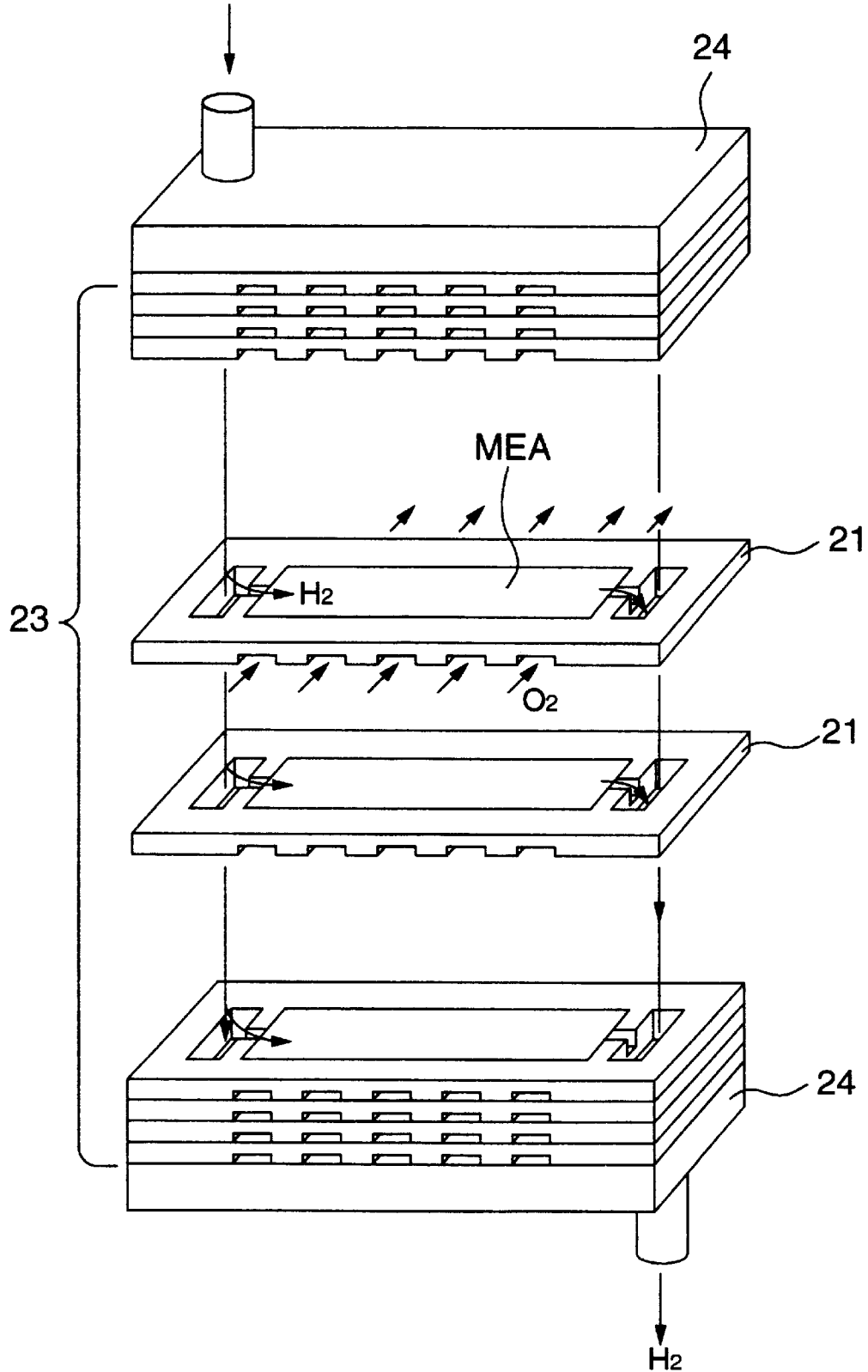

FUEL CELL APPARATUS

BACKGROUND OF THE INVENTION

1. Field of the Invention

This invention relates to a portable power system using fuel cells, and more particularly to a fuel cell apparatus employing polymer electrolyte fuel cells using the air as an oxidizer.

2. Related Art

Examples of prior art techniques, using a fuel cell as a portable power source, are disclosed in JP-A-04-308662 and JP-A-06-60894, and these publications disclose a construction in which a phosphoric acid fuel cell is operated by hydrogen, supplied from a hydrogen storage alloy, and the air. JP-A-54-22537 and JP-A-02-260371 disclose a construction in which a polymer electrolyte fuel cell is operated by hydrogen, supplied from a hydrogen storage alloy, and the air.

In a polymer electrolyte fuel cell, a proton exchange membrane (PEM), which is a polymer electrolyte, is used as an electrolyte, and its general construction is shown in FIG. 3. In the construction using this proton exchange membrane 17, a layer of a positive electrode (oxygen electrode) 18 and a layer of a negative electrode (hydrogen electrode) 19 are formed respectively on opposite sides of the proton exchange membrane 17, and these jointly constitute a unit cell 20.

In the case where hydrogen is used as a fuel while oxygen is used as an oxidizer, a reaction, expressed by the following formula (1), occurs at the negative electrode at the interface of contact between a catalyst and the polymer electrolyte while a reaction, expressed by the following formula (2), occurs at the positive electrode, so that water is formed.

  (1)

  (2)

The catalyst serves to provide an active site or spot of the reaction, and the active sites serve as a conductor for the electrons in the above reactions, and the polymer electrolyte serves as a conductor for the hydrogen ions. However, the polymer electrolyte does not exhibit ion-permeability before it becomes moistened, and therefore with respect to a feature of the power system employing the polymer electrolyte fuel cell, a method of moistening the polymer electrolyte has been extensively studied. The unit cells 20 are connected in series by using separator plates 21 and gaskets 22 (see FIG. 4) to form a laminate 23 (see FIG. 5) which is fastened by end plates 24 to thereby provide one electricity-generating unit.

During the generation of electricity, the energy of an excess voltage, corresponding to a current density at which the electricity is generated, is discharged from the fuel cell body of this construction, and therefore the fuel cell body serves as a heat-generating source.

The hydrogen storage alloy of the hydrogen storage tank for supplying hydrogen to the fuel cell performs a representative reaction, expressed by the following formula (3), in accordance with the storage and discharge of hydrogen:

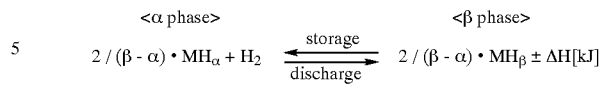  (3)

M: hydrogen storage alloy, H: hydrogen α, β: ratio of hydrogen atoms H to hydrogen storage alloy atoms M in a solid phase (This ratio corresponds to a stoichiometric composition of a hydride phase)

The hydrogen content of the metal, exhibiting a phase (which is a metal phase in which hydrogen is dissolved), increases, and at the time of the reaction (the reaction in a right-hand direction in formula (3)) when the α phase reacts with hydrogen gas and is converted into β phase (hydride), which is a hydride phase, heat ΔH of formation is produced. When hydrogen is emitted from the metal hydride, the β phase is converted into the α phase, thereby absorbing the heat ΔH, and this characteristic is already known. At this time, in order to stably. supply hydrogen, it is necessary to supply heat to the hydrogen storage alloy, and therefore there have been proposed various methods of supplying heat to the hydrogen storage tank.

However, in the above conventional portable fuel cell and the above conventional polymer electrolyte fuel cell system, any consideration has not been given to a construction for achieving a compact design in view of the heat transmission between the fuel cell body, serving as the heat-generating source, and the hydrogen storage alloy portion serving as the heat-absorbing source.

For example, in the construction disclosed in JP-A-54-22537 and JP-A-02-260371, the polymer electrolyte fuel cell is operated by hydrogen supplied from the hydrogen storage alloy, but these publications show only the construction for transmitting heat of the fuel cell to the hydrogen storage alloy, the construction of a wick member for recovering the formed water, and the construction of a water-permeable member, and do not disclose any construction for achieving the compact design. U. S. Pat. No. 5,200,278 discloses various techniques related to the construction of a polymer electrolyte fuel cell and such a fuel cell system, but does not suggest any construction for achieving a compact design, and there is a problem that any consideration has not been given to a construction for achieving the compact design in view of the heat transmission between the fuel cell body, serving as the heat-generating source, and the heat of the hydrogen storage alloy portion serving as the heat-absorbing source.

SUMMARY OF THE INVENTION

With the above problems of the prior art in view, it is an object of this invention to provide a portable power apparatus employing fuel cells, which enables a compact design of the apparatus.

According to the present invention, there is provided a fuel cell apparatus comprising a plurality of fuel cell bodies for generating electricity by the use of hydrogen and the air; a hydrogen storage tank for storing hydrogen required for the fuel cell bodies; a controller for controlling a flow of the hydrogen from the hydrogen storage tank and for controlling an operation and output of fuel cells in the fuel cell bodies; hydrogen supply means connecting the hydrogen storage tank to the fuel cell bodies so as to supply the hydrogen from the hydrogen storage tank to the fuel cell bodies and being releasably connected to the hydrogen storage tank; air feed means for supplying the air, in order to supply oxygen necessary for the generation of electricity by the fuel cells, to the fuel cell bodies; a secondary battery for driving the controller and for supplementally driving the air feed means; and casing receiving the above components therein; wherein the casing has air intake ports and an air discharge port for the air feed means, and also has means by which the hydrogen storage tank can be introduced into and removed from the casing; and wherein at least one pair of fuel cell bodies are disposed respectively on inner surfaces of opposite side walls of the casing, and the air (as cathode fuel) is introduced by the air feed means through the associated side wall of the casing, and is supplied to the fuel cell body. The hydrogen storage tank for supplying anode fuel to the fuel cell bodies is disposed on the side surface of each of the fuel cell body, facing away from a cathode fuel-supplying inlet thereof, through heat transmission means.

With this construction, the air (cathode fuel), introduced through the air intake ports, formed respectively on the opposite side walls of the casing, is supplied to the fuel cell bodies disposed respectively on the inner surfaces of the opposite side walls of the casing, and after oxygen in the air is consumed, the air absorbs heat from the fuel cell bodies serving as heat-generating members, and this heat can be supplied to the hydrogen storage tank disposed on those sides of the fuel cell bodies respectively facing away from the casing through the heat transmission means. The plurality of fuel cell bodies are provided, and the hydrogen storage tank is disposed between these fuel cell bodies, and by doing so, the heat transfer area of the hydrogen storage tank can be efficiently used for heat transmission purposes. With this system construction, the energy of the heat, generated from the fuel cell bodies, can be efficiently transmitted to the hydrogen storage tank, and the stable supply of the hydrogen can be achieved, and the system can be formed into a compact design.

BRIEF DESCRIPTION OF THE DRAWINGS

FIG. 5 is a perspective view showing a fuel cell apparatus formed by connecting a plurality of unit cells together.

DESCRIPTION OF THE PREFERRED EMBODIMENT

A preferred embodiment of the present invention will now be described in detail with reference to FIGS. 1, 2A, 2B and 2C.

Figure 1:
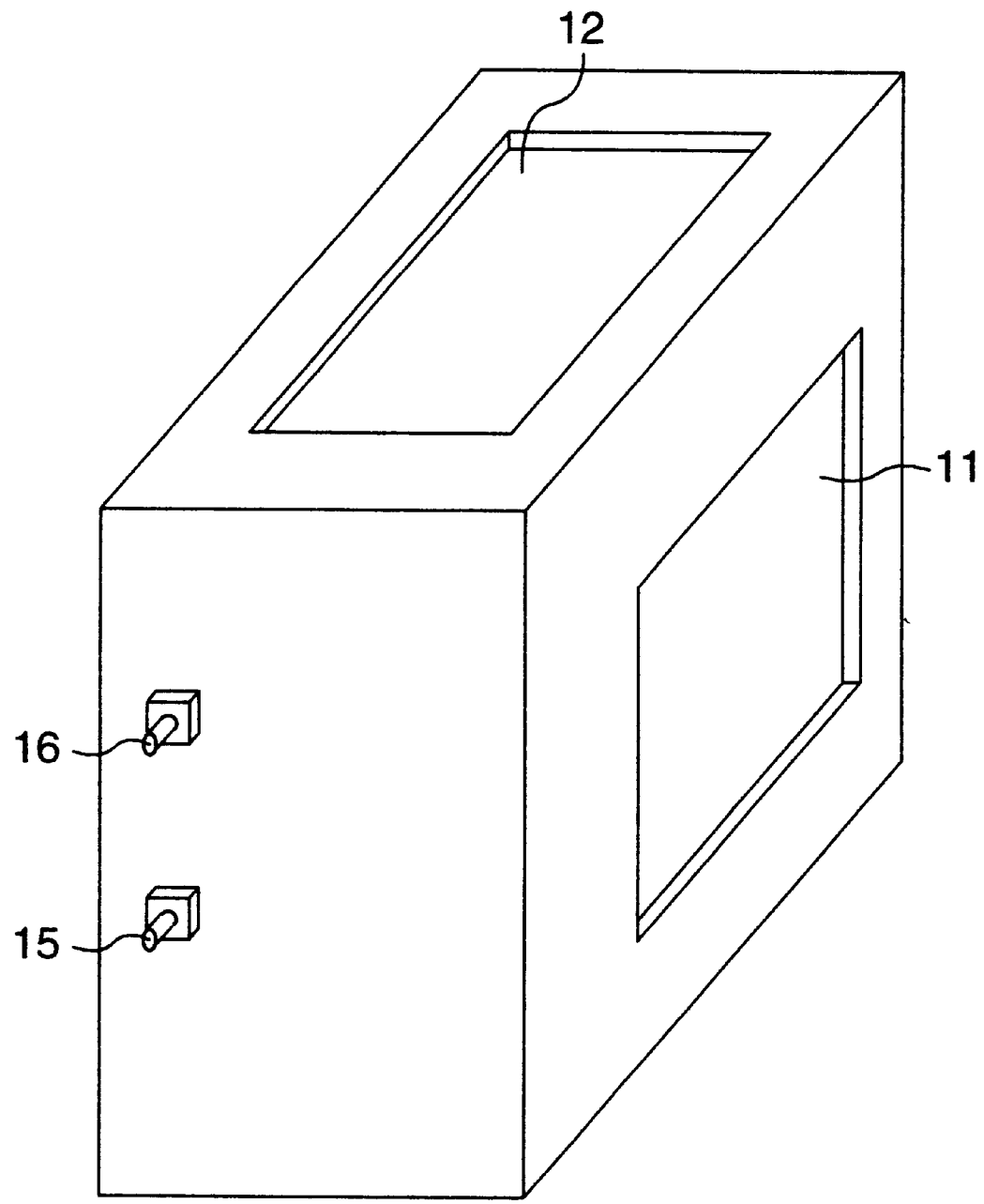
FIG. 1 is a perspective view showing the appearance of a fuel cell apparatus according to the present invention.
Figure 2A:
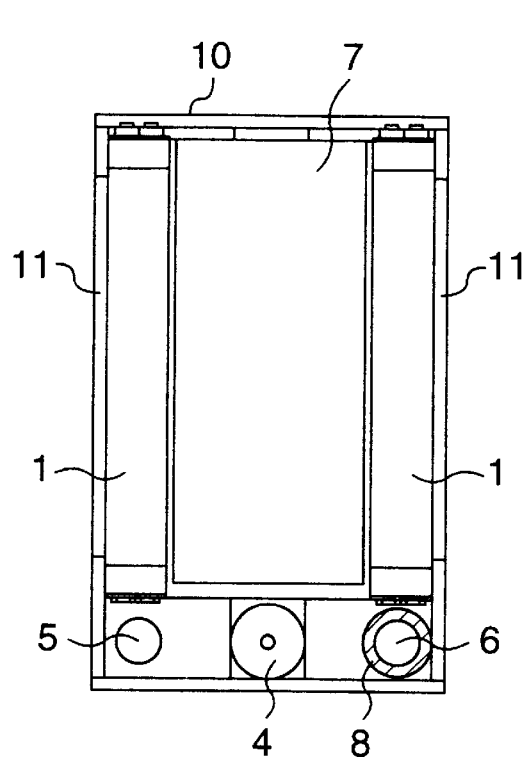
FIGS. 2A, 2B and 2C are schematic views showing the interior of the fuel cell apparatus of FIG. 1, FIG. 2A being a view as seen from the top, FIG. 2B being a view as seen from the front side, and FIG. 2C being a cross-sectional view taken along the line D—D of FIG. 2B.
Figure 2B:
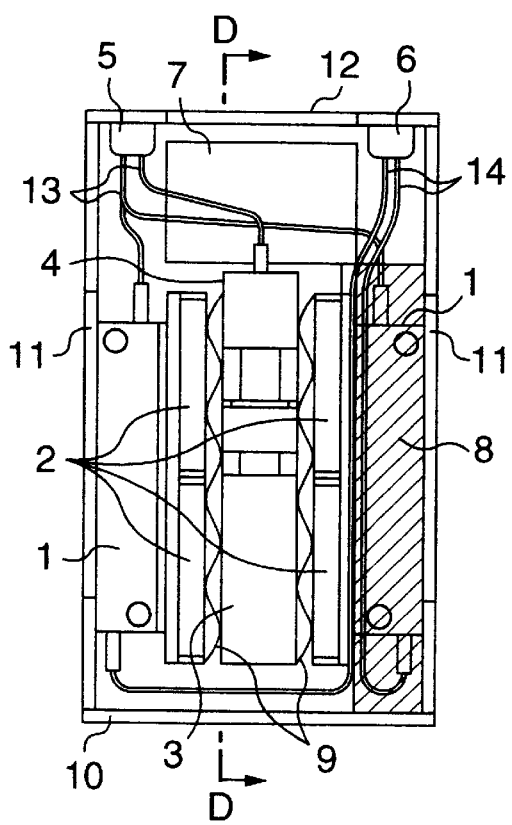
Figure 2C:
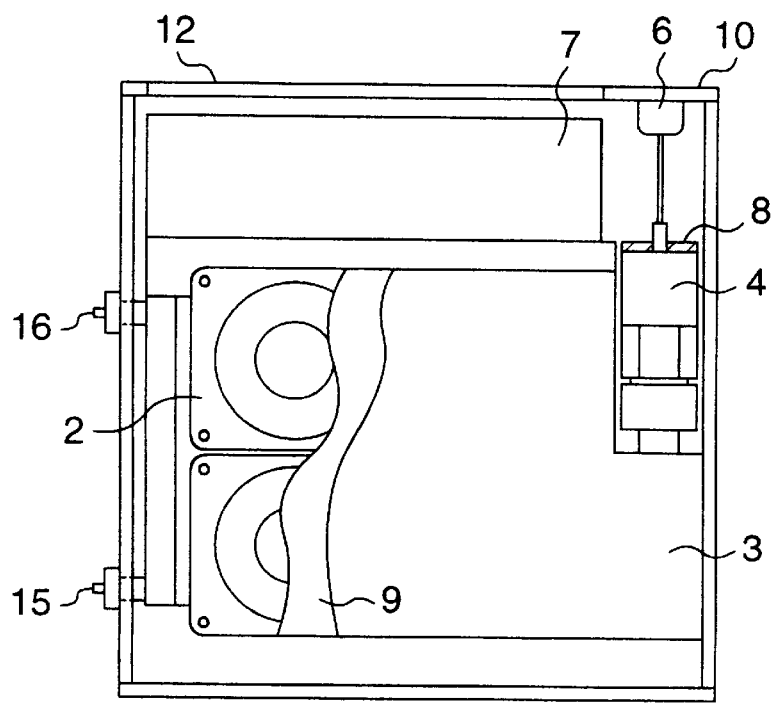
Figure 3:
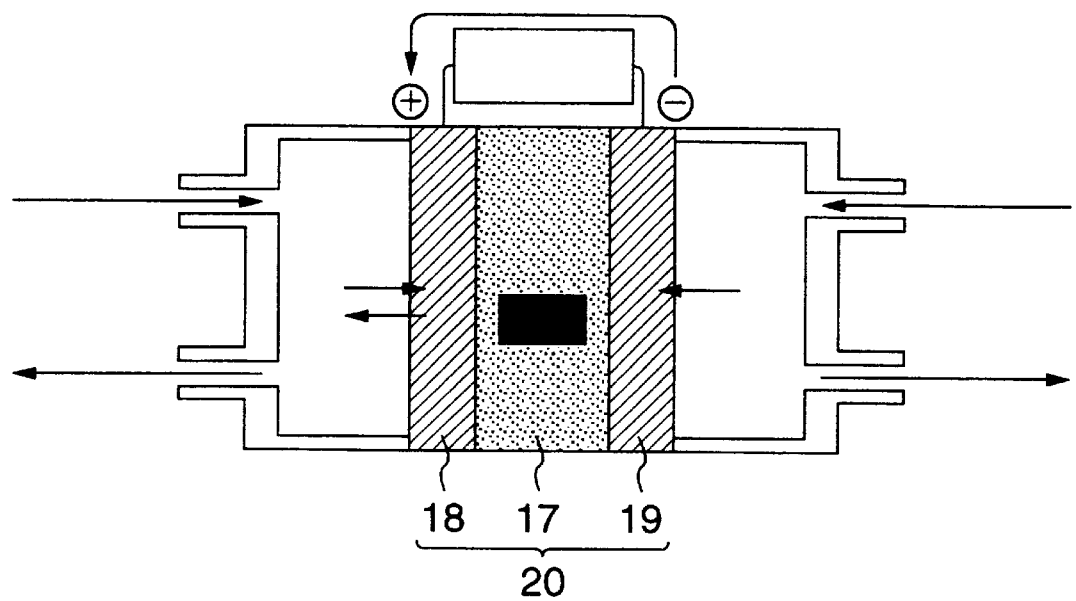
FIG. 3 is a schematic view showing the principle of a fuel cell.
Figure 4:
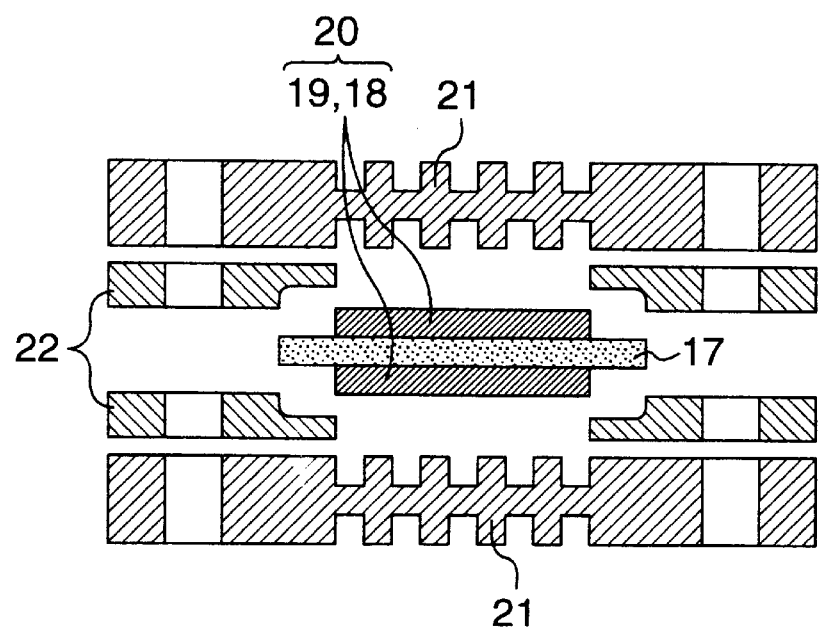
FIG. 4 is an exploded, cross-sectional view of a unit cell of the fuel cell.

FIG. 1 is a perspective view showing the appearance of a fuel cell apparatus according to the present invention. FIGS. 2A, 2B and 2C are schematic views showing the interior of the fuel cell apparatus of FIG. 1, and FIG. 2A is a view as seen from the top, FIG. 2B is a view as seen from the front side, and FIG. 2C is a cross-sectional view taken along the line D—D of FIG. 2B. In FIGS. 1, 2A, 2B and 2C, the fuel cell apparatus comprises a cell apparatus casing 10 constituting a shell of the fuel cell apparatus, fuel cell bodies 1 which generate electricity using hydrogen and the air, air feed means 2 (consisting of fans and so on) for feeding the air (in order to supply oxygen required for the generation of electricity by fuel cells) to the fuel cell bodies 1, a hydrogen storage tank 3 for storing hydrogen (fuel gas) to be used in the fuel cell bodies 1, hydrogen supply means connecting the hydrogen storage tank 3 to the fuel cell bodies 1 so as to supply the hydrogen from the hydrogen storage tank 3 to the fuel cell bodies 1, a controller 7 for controlling the operation and output of the fuel cell bodies 1, a secondary battery 8 for supplementally driving the air feed means 2 and for driving the controller 7, and heat transmission means 9 provided between each fuel cell body 1 and the hydrogen storage tank 3 through the air feed means 2 so as to transmit heat, generated from the fuel cell bodies 1, to the hydrogen storage tank 3. The fuel cell bodies 1, the air feed means 2, the hydrogen storage tank 3, the hydrogen supply means, the controller 7, the secondary battery 8, and the heat transmission means 9 are received and arranged within the cell apparatus casing 10 as shown in the drawings.

The hydrogen supply means comprises a pressure control device 4 for controlling the pressure of the hydrogen to be supplied to the fuel cell bodies 1, and a stop valve 5 for controlling the supply of the hydrogen, controlled in pressure by the pressure control device 4, to the fuel cell bodies 1. The pressure control device 4 has at its one end a connecting portion which can be releasably connected to the hydrogen storage tank 3, and when the hydrogen storage tank 3 is disconnected from the valve 4, the valve 4 is closed to prevent the supplied hydrogen from escaping. The hydrogen, supplied from the hydrogen storage tank 3 to the stop valve 5, is distributed to the fuel cell bodies 1 via hydrogen supply pipes 13. Gas (containing impurities), discharged from the fuel cell bodies 1, is fed to a discharge valve 6 via exhaust gas pipes 14, and is discharged to the exterior. This impurities-containing gas to be thus discharged is the gas which intrudes from a positive electrode into a negative electrode by diffusion during the stop of the operation of the fuel cell body, and this gas is discharged at the time of starting the operation.

The cell apparatus casing 10 has air intake and discharge ports for drawing and discharging the air required for the operation of the fuel cell bodies 1, and the air intake ports 11 are formed respectively through opposite side walls of the cell apparatus casing 10, and the fuel cell apparatuses 1 are disposed respectively on inner surfaces of these opposite side walls, and the air discharge port 12 is formed through an upper wall of the casing 10. A primary switch 15 for interrupting the electrical connection between the secondary battery 8 and the controller 7, as well as a secondary switch 16 for interrupting the electrical connection between the fuel cell bodies 1 and the controller 7, is provided on the cell device casing 10.

As the heat transmission means 9, metal plates having good thermal conductivity, such as copper and aluminum, or a heat exchanger, having heat-radiating fins, can be used.

Small-size fans can be used as the air feed means 2. The air feed means 2 serves to draw the air into the fuel cell bodies 1, and also serves to feed the air, which has received heat from the fuel cell bodies 1, to the hydrogen storage tank 3. The heat transmission is effected not only through the air but can be enhanced by forming the air feed means from a material having good thermal conductivity.

The hydrogen storage tank 3 is made of a metal or the like having good thermal conductivity, and a hydrogen storage alloy within the hydrogen storage tank 3 is formed into a construction having a large heat-transfer area formed, for example, by a number of fins of metal.

Each of the fuel cell bodies 1 and the air feed means 2 are joined together in an air-tight manner so that the air feed means 2 can efficiently draw the air into the fuel cell body 1, and the air feed means 2, the heat transmission means 9 and the hydrogen storage tank 3 are connected together in a thermally efficient manner.

As the secondary battery 8, a lithium secondary battery, having a good volume efficiency, a nickel-hydrogen storage battery or a nickel-cadmium storage battery can be used.

In the fuel cell apparatus according to the above construction, the air, introduced through the air intake port 11 of the cell apparatus casing 10 into that side of each of the fuel cell bodies 1, disposed adjacent to the side wall of the casing 10, by the air feed means 2, supplies oxygen to the fuel cell body 1, and then absorbs heat from the fuel cell body 1, and is discharged from that side of the fuel cell body 1 disposed close to the hydrogen storage tank 3. The thus discharged air supplies heat to the air feed means 2, and then is discharged from the cell apparatus casing 10 through the air discharge port 12. The heat, supplied to the air feed means 2 from the air discharged from each fuel cell body 1, is supplied to the hydrogen storage tank 3 through the heat transmission means 9. Thus, the plurality of fuel cell bodies 1 are provided respectively on the opposite sides of the hydrogen storage tank 3, and with this construction, the heat transfer area of the hydrogen storage tank 3 can be efficiently used.

In the above embodiment, although the hydrogen storage tank is interposed between the two fuel cell bodies, the number of the fuel cell bodies, as well as the number of the hydrogen storage tank, is not limited to that of the above embodiment, and any other suitable arrangement may be used insofar as the hydrogen storage tank is interposed between the fuel cell bodies.

As described above, in the present invention, the heat of the fuel cell bodies, performing the radiation reaction, can be efficiently transmitted to the hydrogen storage tank performing the endothermic reaction, and the hydrogen can be stably supplied from the hydrogen storage tank, and therefore the operation of the fuel cell apparatus can be effected stably.

What is claimed is:

1. A fuel cell apparatus for use as a portable power source, comprising a plurality of fuel cell bodies; a hydrogen storage tank for storing hydrogen required for said fuel cell bodies; a first controller for controlling a flow of the hydrogen from said hydrogen storage tank and a second controller for controlling an operation and output of fuel cells in said fuel cell bodies; hydrogen supply means connecting said hydrogen storage tank to said fuel cell bodies so as to supply the hydrogen from said hydrogen storage tank to said fuel cell bodies; air feed means operated by using a portion of the output of the fuel cells controlled by said second controller for supplying the air to said fuel cell bodies, in order to supply oxygen necessary for the generation of electricity by the fuel cells; a secondary battery for driving said first and second controllers and for supplementally driving said air feed means; and a casing receiving the above components therein;

wherein said casing has air intake ports and an air discharge port for said air feed means, and also has means by which said hydrogen storage tank can be introduced into and removed from said casing; and said hydrogen supply means is releasably connected to said hydrogen storage tank; and wherein at least one pair of fuel cell bodies is disposed respectively on inner surfaces of opposite side walls of said casing, and the air is introduced into each of said fuel cell bodies from said intake ports in the associated side walls of said casing, and said hydrogen storage tank is disposed on that side surface of each of said fuel cell bodies, facing away from the associated side wall of said casing, through heat transmission means.

2. A fuel cell apparatus according to claim 1, wherein said heat transmission means comprises metal plates having good thermal conductivity.

3. A fuel cell apparatus according to claim 1, wherein said heat transmission means comprises a heat exchanger having heat radiating fins.

* * * * *